US 6,434,526 B1
United States Patent
Cilurzo et al.
Date of Patent: Aug. 13, 2002

(54) NETWORK APPLICATION SOFTWARE SERVICES CONTAINING A SPEECH RECOGNITION CAPABILITY

(75) Inventors: Frank Cilurzo, Trumbull; Roger Matthew Miller, Brookfield, both of CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/107,568

(22) Filed: Jun. 29, 1998

(51) Int. Cl.[7] .............................................. G10L 15/26
(52) U.S. Cl. ..................................... 704/270.1; 704/235
(58) Field of Search ................................. 704/235, 270, 704/270.1

(56) References Cited

U.S. PATENT DOCUMENTS

| | | | |
|---|---|---|---|
| 5,524,169 A | | 6/1996 | Cohen et al. ................. 395/2.4 |
| 5,632,002 A | * | 5/1997 | Hashimoto et al. .......... 704/231 |
| 5,799,273 A | * | 8/1998 | Mitchell et al. ............. 704/235 |
| 5,857,099 A | * | 1/1999 | Mitchell et al. ............. 704/235 |
| 5,909,662 A | * | 6/1999 | Yamazaki et al. ............ 704/221 |
| 5,960,399 A | * | 9/1999 | Barclay et al. .............. 704/270 |
| 6,078,886 A | * | 6/2000 | Dragosh et al. ............. 704/270 |

FOREIGN PATENT DOCUMENTS

| | | | | |
|---|---|---|---|---|
| GB | 2 082 820 A | * | 3/1982 | ............. G06F/3/16 |
| GB | 2 323 693 A | * | 9/1998 | ............. G10L/3/00 |
| GB | 2 323 694 A | * | 9/1998 | ............. G10L/3/00 |

OTHER PUBLICATIONS

AT&T Advanced Speech Products Group (3 pgs).
Besteam IBM Business Enterprise Solutions Team (4 pgs).

* cited by examiner

*Primary Examiner*—Tālivaldis Ivars Šmits
(74) *Attorney, Agent, or Firm*—J. Crockatt

(57) ABSTRACT

Speech recognition software is provided in combination with application specific software on a communications network. Analog voice data is digitized at a user's location, identified as voice data, and transmitted to the application software residing at a central location. The network server receiving data identified as voice data transmits it to a speech server. Speech recognition software resident at the speech server contains a dictionary and modules tailored to the voice of each of the users of the speech recognition software. As the user speaks, a translation of the dictation is transmitted back to the user's location and appears in print on the user's computer screen for examination and if necessary, voice or typed correction of its contents. Multiple users have interleaved access to the speech recognition software so that transmission back to each of the users is contemporaneous.

15 Claims, 5 Drawing Sheets

FIG. 4
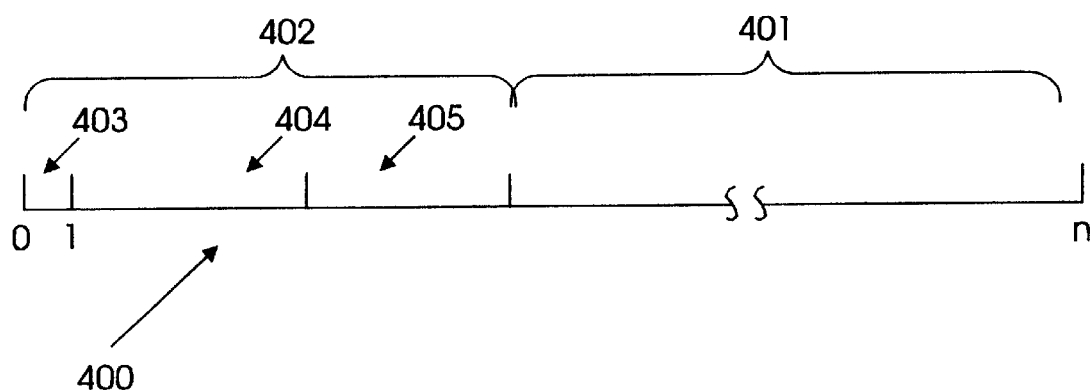
FIG. 5A
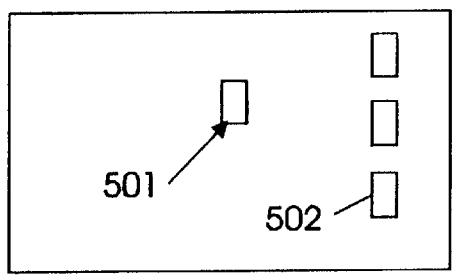
FIG. 5B
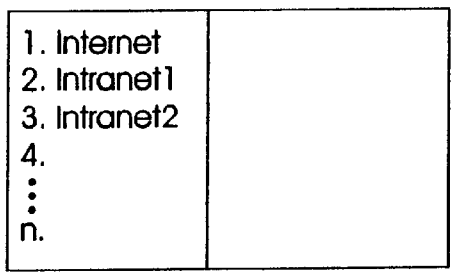
FIG. 5D
Lotus notes
Spreadsheet
Word Processor
Keyboard
Voice
FIG. 5E
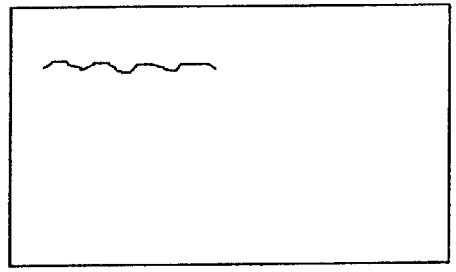
FIG. 5C
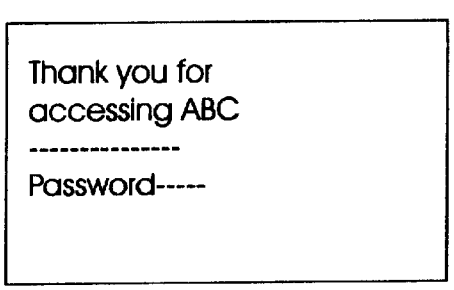
FIG. 5F
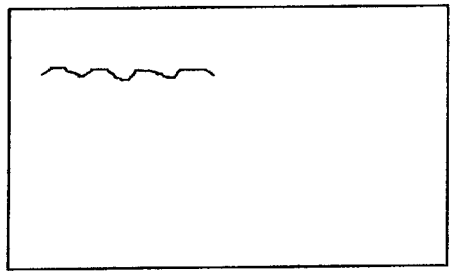

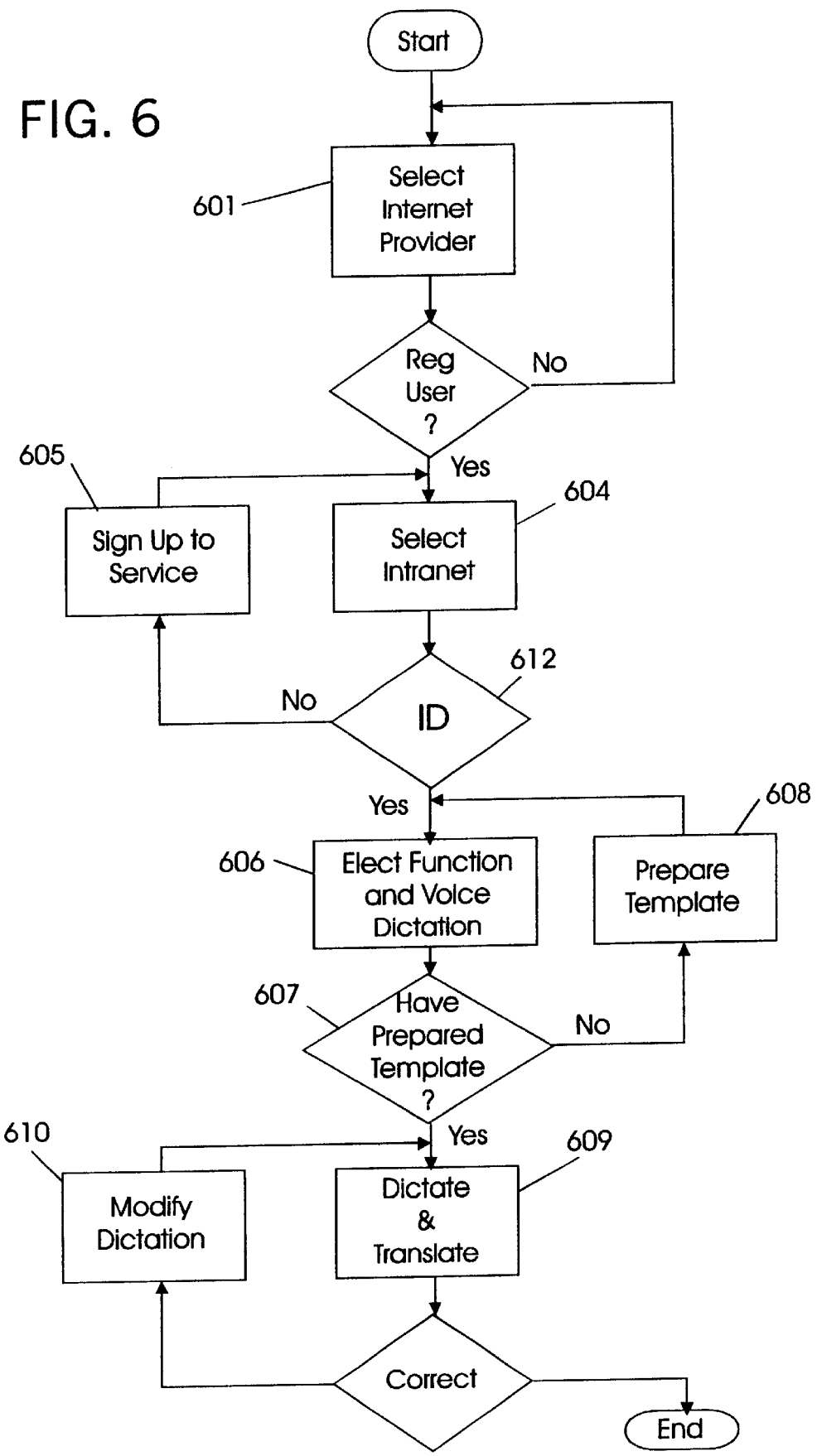

NETWORK APPLICATION SOFTWARE SERVICES CONTAINING A SPEECH RECOGNITION CAPABILITY

FIELD OF THE INVENTION

The present invention relates to communication networks and more particularly to the provision of a speech recognition capacity to special application program services provided on a network.

BACKGROUND OF THE INVENTION

A small business can easily afford the cost of a personal computer and associated general purpose software such as word processing, spread sheet and database programs. In fact a personal computer bundled with state of the art general purpose software, can be purchased for well under $6000. Those bundled packages usually include free limited time warranties for telephone and on-site services for the hardware and software of the package. Further, extensions of warranties can be purchased at reasonable cost from the manufacturers of the hardware and/or software or from local service providers.

As opposed to the costs involved in the obtaining and maintaining of a computer system with general purpose software, the initial cost and upkeep of specific application software can be prohibitive to the small business entrepreneur, often requiring an initial investment of more than 10 times the cost of the previously mentioned hardware and its bundled general purpose software. services for maintaining the specific application software can be equally expensive and service may not be immediately available.

Because of the expense, many small businesses forego the use of excellent available application specific software and develop their own application specific software. This home based software usually is not as good or reliable as the marketed products. Beside as being saddled with inferior software such a small user must devote a significant amount of time and energy to the development and upkeep of the user developed software.

Speech recognition software, such as IBM's existing Via Voice voice dictation software product, is a tool that can improve work efficiency. For instance, in the field of radiology a large number of patient x-rays are reviewed on a daily basis. Typically, a radiologist will dictate his findings into a tape recorder while reviewing the x-rays. A radiologist may see up to 25 patients a day and have a pressing need to be otherwise productive during the time they are reading x-rays. After the radiologist has dictated, the tape is usually given to a transcriptionist who listens to the entire tape and types a patient report. The turnaround time for a final patient report can take up to 2–3 days. To finish, the transcriptionist may have to stop working to contact the radiologist because the dictation cannot be understood. The turnaround time can be even poorer in large city hospitals where hundreds of x-rays a day are involved. The delay not only impacts the primary care providers, but also affects payments by insurance companies. Radiologists would be better served where the report is accurate the first time so that it can be distributed quickly to individuals who need the information.

With Speech recognition software, such as IBM's MedSpeak/Radiology software for continuous speech recognition, the radiologist can dictate quickly into a microphone connected to his PC and create the report and, if necessary, correct if for accuracy. The radiologist may then choose to send it to a local printer or send a copy of it on-line to those in need of its contents. Radiologists and other physicians can dictate with both hands and eyes free to examine the patient. The reports for patients seen are finalized, completed and sent on-line the day of the examination. In this way, critical information gets in the hands of people waiting for it in a shorter period of time. The radiologist can eliminate large backlogs of uncompleted reports, see more patients and quickly receive compensation for his services.

While speech recognition software with a general purpose dictionary is generally inexpensive, one with a vocabulary for specific applications can be expensive. The cost of a special dictionary, coupled with the cost of other software such as billing software and professional and governmental compliance software, may result in a small user concluding to forego the use of speech recognition. Furthermore, the cost of development of the dictionary for certain fields has been a deterrent where the possible market for sale of the dictionary is not as large as the radiology field.

BRIEF DESCRIPTION OF THE INVENTION

In accordance with the present invention, speech recognition software is provided in combination with application specific software on a communications network. Analog voice data is digitized at a user's location, identified as voice data, and transmitted to the application software residing at a central location. The network server receiving data identified as voice data transmits it to a speech server. Speech recognition software resident at the speech server contains a dictionary and modules tailored to the voice of each of the users of the speech recognition software. As the user speaks, a translation of the dictation is transmitted back to the user's location and appears in text on the user's computer screen for examination and if necessary, voice or typed correction of its contents. Multiple users have interleaved access to the speech recognition software so that transmission back to each of the users is contemporaneous.

With the above arrangement, a fixed or use related monthly rental fee replaces the purchase price and service charges for the software. Since the software is shared by many users, the entry cost for each user is reduced thereby increasing the potential market for the software. Furthermore, since service of the software occurs at the central location, it can be more expeditiously performed reducing software downtime.

Therefore it is an object of the present invention to provide, on a network, specific application software with a speech recognition capability.

It is another object of the invention to provide, on a network, software with speech recognition capability that capacity can be expanded dynamically.

BRIEF DESCRIPTION OF THE DRAWINGS

These and other objects of the present invention can be understood from the following detailed description of embodiments of the invention while making reference to the accompanying figures of which:

FIG. 4 is a diagram illustrating data packet for the system of FIG. 3;

FIGS. 5a to 5f are graphic presentations of user computer screens in accordance with the present invention; and FIG. 6 is a flow diagram illustrating the operation in response to user selection of the computer screens of FIGS. 5a to 5f.

DETAILED DESCRIPTION OF THE INVENTION

Figure 1:
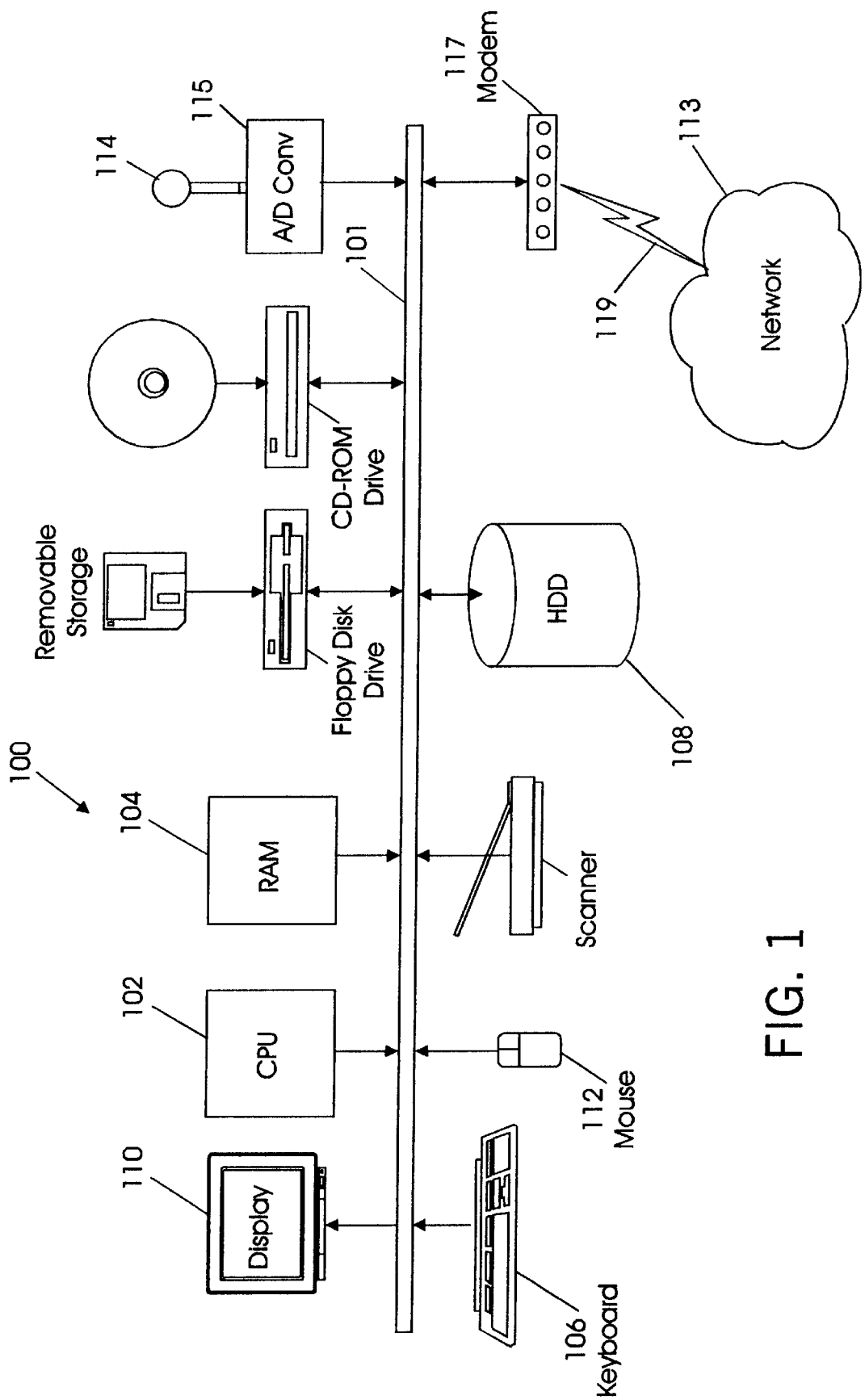
FIG. 1 is a block diagram of a computer for use with the present invention.

The present invention is capable of being used by a subscriber to the network software service on any properly configured general purpose computer system, such as the one shown in FIG. 1. Such a computer system 100 includes a processing unit (CPU) 102 connected by a bus 101 to a random access memory 104, a high density storage device 108, a keyboard 106, a display 110 and a mouse 112. An example of such a computer is an IBM Personal Computer of the International Business Machines Corporation, such as an Aptiva L31 Model with a 233 mh Pentium processor of Intel Corporation operating under Microsoft Windows 95 operating system of the Microsoft corporation. To record voice input, the computer system 100 includes a microphone 114 to receive analog voice messages and an analog to digital (A/D) converter 115 to convert the messages to binary encoded data. While the A/D converter is illustrated as a stand alone unit, it is understood that A/D conversion could, and preferably is, performed as a software based function of the computer 100.

The digitally encoded voice data is compressed by the processor for transmission onto the network 113. To transmit data to and receive data from the network 113, a modem 117 is provided to connect the computer 100 to the network 113 through a standard telephone connection 119. Also required, is an internet browser capable of running Java, software of Sun Microsystems. Examples of such a browser, is Netscape Navigator, by Netscape Communications Corporation, or Internet Explorer, by Microsoft Corporation.

Figure 2:
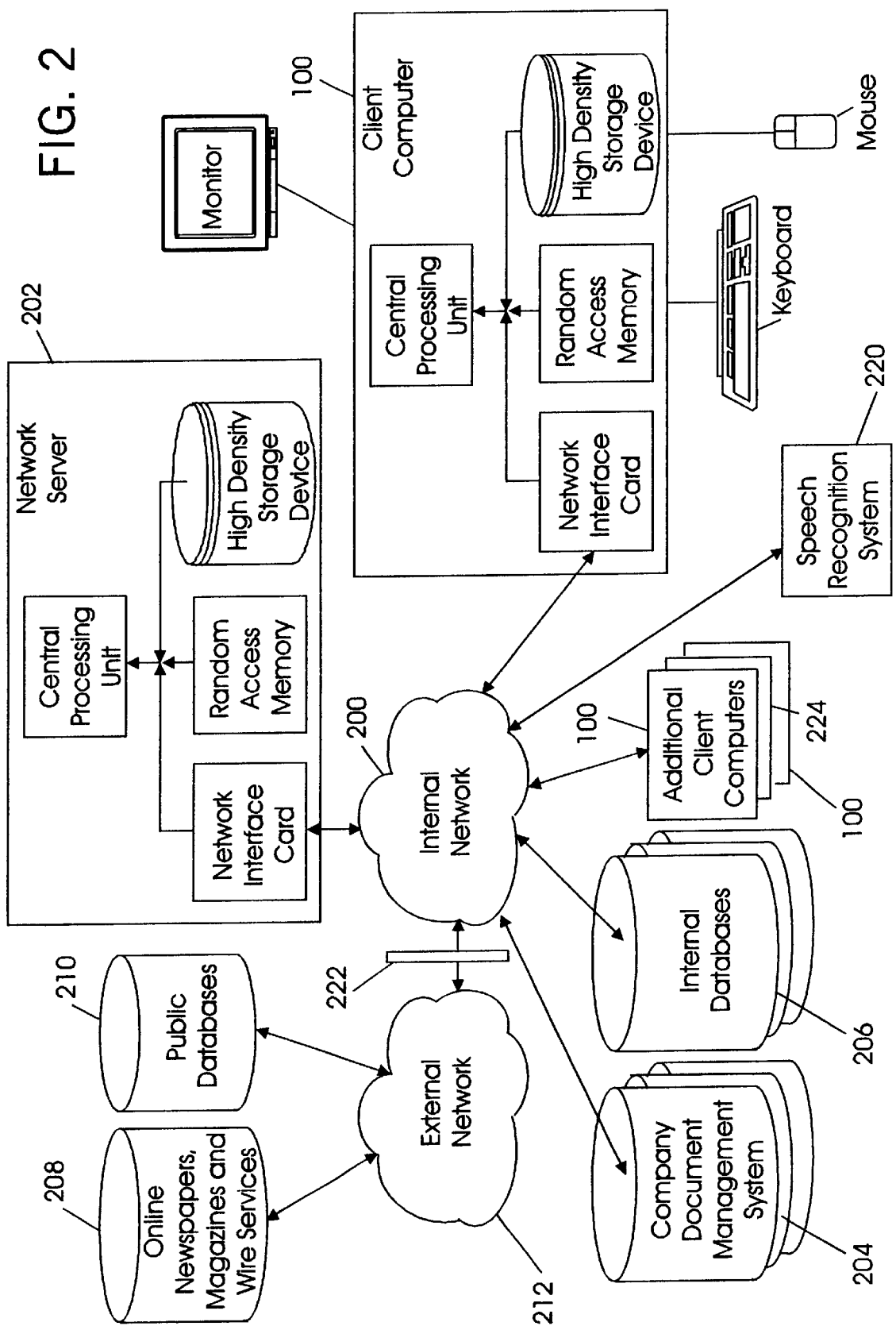
FIG. 2 is a block diagram of a network of computers using the present invention including computers such as the one shown in FIG. 1.

As shown in FIG. 2, a number of computers 100, such as the one described in FIG. 1, are connected in a private intranet network 200 with a server 202 so that the computers 100 can obtain information stored in the internal sources of the private intranet. The intranet 200 is part of a larger network 212 with public internet access capability. An example of such a larger network is the IBM Global Network (IGN) which, in addition to providing access to private networks, provides access to services on the public internet 212. In addition to the access requirements for the IBM Global Network, entry onto the private intranet requires an appropriate user ID and password. A "firewall" 222 separates the public internet 212 from the private internet allowing only those with the proper ID and password to enter the intranet 200 from the public internet 212.

Internal sources of the intranet 200 are company document management systems 204, and internal databases 206 maintained separately for each client of the private intranet 200 service. Also in accordance with the present invention, the internet is provided with a speech recognition system 220 capable of responding to compressed digitized data of voice commands and voice dictation provided by the client computers 100 either from an individual computer 100 or a client's network of such commuters.

Figure 3:
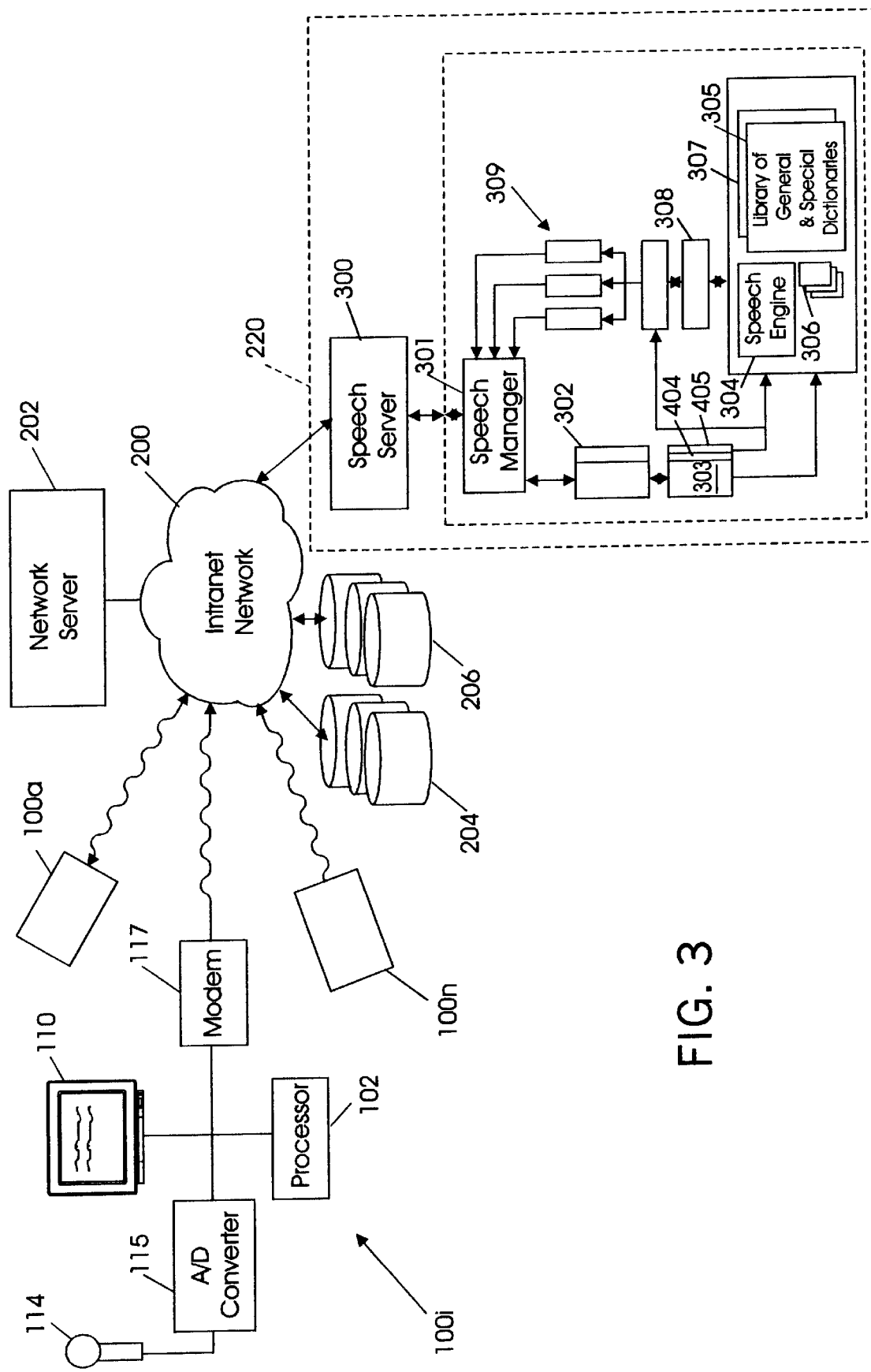
FIG. 3 is a block diagram of a speech recognition system in accordance with the present invention.

Referring now to FIG. 3, a user turns on their computer 100 and opens a web browser to engage in a session on the Intranet 200. Once access to the Intranet has been established through use of the users ID and password, icons appear on the user's screen 110 that give the user an option between use of voice or keyboard for data entry. Selection of the Speech Window icon invokes speech recognition, and a speech window appears on the screen 110 prompting the user for speech input. The user's speech input into the microphone 114 is converted from an analogue signal to digital data by A/D converter 115. The digitally encoded speech data is compressed for transmission on the intranet 200 to the network Server 202 via modem 117, leased line connection or a LAN connection. As shown in FIG. 4, linkage information 402 proceeds the transmission of the speech data information 401. In addition to the clients ID and password, this linkage information contains a bit 403 of information identifying that the transmitted information is either voice or print data, and information indicating who the speech facility user is.

The speech data identified by the bit of information 403 is routed by the network server 202 to the speech server 300 of the speech recognition system 220. The speech server 300 uses the identifying information to track the sources of speech input and to determine how many users are simultaneously using the speech facility.

In the speech server 300, the speech data is processed by the speech server software engine 304. The speech software manager 301 controls access to the speech server engine 304 so that multiple users trying to use the speech facility can be serviced at the same time. The number of speech sessions that can be programmed to open can be increased or decreased depending upon the traffic pattern that develops. To accomplish this, the speech manager divides data into packets. As shown in FIG. 4, each packet 400 contains the compressed speech data 402 and an ID identifying the client 404 and the client user 405.

Referring back to FIG. 3, the speech manager places the packets from all sources 100 a to n into a first in—first out (FIFO) register 302. As the packet emerges from the register, the data is decompressed by decompression element 303 and fed to the speech engine 304. The client and user bytes 404 and 405 of the linkage information is used to select the appropriate user personal speech template 306 for use in conjunction with a speech library including general purpose and special purpose dictionaries 305 and 307.

Once speech data has been received by the speech engine 304, the speech recognition algorithm will apply a trigram statistical model, which will determine the proper context of three words appearing in sequence and then after selecting the possible words, perform a further detailed analysis of the remaining likely candidates be able to be accommodated at any given time.

The data from the engine 304, now representative of print messages, is compressed by compression module 308 and then recombined with the user and client information 404 and 405 of the packets 400. Based on the linkage information, the modules are then divided by user into FIFO registers 309 for transmission by the network server 202 to the user locations and for storage in the user databases 206 at the central location. At the user location, the data is again decompressed or display on the user screen 110 for examination and correction and at users election stored in users storage. Correction of the displayed data can be made by either voice or keyboard data entry. When keyboard data entry is elected, the user employs a command to stop voice data entry, such as "stop dictation". Then the user can make the correction with either keyboard or mouse. When voice data entry is to be resumed, the user employs a command such as "resume dictation". Then the user can proceed with voice data entry. The network server 202 responds to the first command to enter the keyboard changes to the dictated data stored in network files. The network server responds to the record command by returning interpretation of voice entered data to the speech engine 304.

FIGS. 5a to 5f illustrate screens for activation and use of the speech recognition and dictation software by an authorized user. In FIG. 5a, the user selects the network, such as the IBM IGN network 501. once selected, the user is presented with the network screen of FIG. 5(b). From the screen, the user can elect from the application menu. As shown in FIG. 5(b), the application menu includes choices of the public internet and a series of private intranet services. The user then selects the private intranet service of his choice. Upon selection of the private intranet, the user, as shown in FIG. 5(c), is asked to enter his ID and password. Once the correct ID and password have been entered, the user, in FIG. 5(d), is given a choice of programs to use, such as a database program, a word processor, etc. He is also given the choice of electing either keyboard or voice data entry. On selection of voice data entry and say to send a note using Lotus Notes, the user in FIG. 5(e) is presented with a Lotus Notes message screen and instructed to start dictating. As the user dictates, the message appears in print on his screen. When satisfied with the message, the user can close the function verbally. Closing the function results in the message in FIG. 5(f) indicating the closing of the speech session.

Referring now to FIG. 6, the entry procedure of the present invention is disclosed. The user first selects an internet service provider 601. If not a registered user, he embarks on an entry procedure 603. When entry to the internet service has been granted, the user is allowed to bring up a selection list and select from a number of services presented on the list 604. When the user selects a restricted service such as a medical recording service, the user by a screen such as screen 5(c) is asked to enter his user ID and password. If not registered, the user must sign up to the service and when approved, be given an ID and select a password. With an approved ID and password entered, the user is asked to select an application and is also offered a choice of voice or keyboard data entry by the screen of FIG. 5(d). Upon selection of an application 606, say Notes and voice data entry, the system checks for a template of user with the entered ID and password. If none is in existence, the user must prepare a template by dictation of presented text into the system 608. With a template available, the user is presented with an application screen as shown in FIG. 5(e), and asked to dictate 609. When dictation is complete and, if necessary, corrected, the user can close down the session 611.

In an alternative embodiment of the invention, the user selects use of voice dictation earlier in the process. The voice dictation icon 502 is presented on the screen of FIG. 5(a) along with the icon of the internet provider. The user then can select voice dictation at the same time as he selects the internet provider. With this entry selection of voice dictation, choice of the intranet service in step 604, entry of the ID and password in step 612 and selection of the particular function in step 606 can all be done verbally. Use of the verbal entry of the ID and password evokes a further check on whether the user is a valid user. The voice pattern of the user can be checked against the template for the users voice pattern stored in the voice recognition module. Of course, this option cannot be used by new enrollees without preparation of a voice template.

Above we have described one embodiment of the invention. it is understood by those skilled in the art that various changes in form and detail can be made. For instance instead of use in a private intranet, the speech server could be used in chat sessions. It would permit simultaneous input by the participants and allow voice input of each participant to be displayed on the screens of all participants. Also, though the present invention is particularly advantageous to small users, it also has advantages for larger users. For instance, it eliminates the need of the larger user to devote resources to the management of the speech recognition system. Therefore it is understood that those and other changes can be made without departing from the invention as defined by the spirit and scope of the appended claims.

We claim:

1. A speech recognition system for network provided services comprising:

a private network permitting access to only network subscribers, which private network contains an application software service application specific software, located at a central location, that is provided through a network server to multiple independent clients at various client locations, each client location connected to the network through a client computer;

a first transducer in each client location for transduction of voice messages by users of the computers;

a second transducer in the client location for transcription of digital print character message by users of the computers;

analog to digital data conversion software in each client location for converting analog voice messages into digital speech data and combining the digital speech data with linkage information identifying the digital data as speech data and the client and user source of the digital speech data;

a data link connecting the client computer to a network server at the central location to transfer digital data to the network;

a speech server containing speech recognition software at the central location for the simultaneous receipt and handling of the digital speech data from the client locations and converting the digital speech data to digital data representative of print messages, said speech recognition software including a speech engine, a speech library and a speech template for each of the users of the speech recognition software;

speech manager at the central location for providing speech services to multiple users at the same time by dividing digital speech data from the various client locations into packets at the central location on the basis of the traffic pattern of users trying to use the speech server, each packet containing digital speech data and an ID identifying the user said speech manager interleaving the packets containing the digital speech data from multiple simultaneous users and transferring the packets to the speech engine so that the packets from users share the speech engine on a first in first out basis;

decoding circuitry at the central location responsive to the linkage information in the packets to provide the speech data to the speech engine and to select the proper speech template for the user to be used with the speech library in converting digital speech data to digital data representative of print; and routing circuitry using the linkage information to direct the printed message data to an appropriate client computer location so that the independent clients can be provided with the textual transmission of their voice messages.

2. The speech recognition system of claim 1 including separate internal databases in the central location in the private network for each of the clients of the private network.

3. The speech recognition system of claim 2 including an internet connection to the private network allowing only network subscribers with an appropriate id and password to enter the private network from the internet.

4. The speech recognition system of claim 1, wherein said speech manager includes software registers arranged in stages for transmission of the packets of digital speech data to the speech engine on a first in first out basis.

5. The speech recognition system of claim 4, wherein the speech data in the packets is provided as compressed data to the first register stage.

6. The speech recognition system of claim 5 including decompression logic for receiving compressed data from the last register stage and providing uncompressed data to the speech engine.

7. The speech recognition system of claim 6 including means for using the speech pattern of the user to check the verbal entry of an ID and password to determine if user is a valid user.

8. A process for use of speech recognition in services provided on a computer network by a network server to multiple unrelated clients comprising:

providing analog voice and print character messages to digital data signals at client locations on the network;

compressing the digital data at the client locations and transferring it to a central service location with linkage information that identifies the digital data as either print character or speech data and the client source of the data;

decompressing the digital data identified as speech data at the central service location;

providing at the central location a speech server with speech recognition software for the simultaneous translation of the decompressed digital speech data into print characters which software has a speech engine and personal speech templates of users to be combined with the core library of speech templates in converting the decoded digital speech data to digital data representative of printed messages;

a plurality of other application software programs at the central location to be used with the software of the speech server by user selection on a computer screen at the client location;

dividing the speech data into packets at the central service location on the basis of the traffic pattern of users trying to use the speech server at the central location;

interleaving the packets of digital speech data from multiple simultaneous users and feeding the interleaved speech packets to the speech engine for converting the packets to text based data on a first in first out basis irrespective of client source to provide the simultaneous services to the clients;

using the linkage information to access users personal speech templates; and combining the converted print character data with destination information at the central location and returning them to the appropriate client location on a first in first out basis.

9. The process of claim 8 including providing separate databases in the central location for each of the clients of the network.

10. The processor claim 8 including allowing only network subscribers with an appropriate ID and password to enter the network;

using the verbal entry of the ID and password to check if the user is a valid user by checking the verbal entry against template for the user's voice pattern stored in the speech server.

11. Apparatus for use in providing speech recognition services on a network at a central location to multiple unrelated clients comprising:

a speech server containing speech recognition software at the central location for the simultaneous receipt and handling of the digital speech data from different client locations and converting the digital speech data to digital data representative of print messages, said speech recognition software including a speech engine, a speech library and a speech template for each of the users of the speech recognition software;

speech manager at the central location for providing speech services to multiple users at the same time by dividing digital speech data from the various client locations into packets at the central location on the basis of the number of users trying to use the speech server at the central location to increase and decrease the number of simultaneously serviced speech servers based on the traffic pattern each packet containing digital speech data and an ID identifying the user, said speech manager interleaving the packets containing the digital speech data from multiple simultaneous users and providing the packets to the speech engine on a first in first out basis;

decoding circuitry at the central location responsive to the linkage information in the packets to provide the speech data to the speech engine and to select the proper speech template for the user to be used with the speech library in converting digital speech data to digital data representative of print; and routing circuitry using the linkage information to direct the printed message data to an appropriate client computer location so that the independent clients can be provided with the textual transmission of their voice messages.

12. The apparatus of claim 11, wherein said speech manager includes software registers arranged in stages for transmission of the packets of digital speech data to the speech engine on a first in first out basis.

13. The apparatus of claim 12, wherein the speech data in the packets is compressed data at the first stage of the registers.

14. The apparatus of claim 13 including decompression logic for receiving compressed data from the last stage of the software registers and providing uncompressed data to the speech engine.

15. The speech recognition system of claim 14 including means for using the speech pattern of the user to check on verbal entry of an ID and password to determine if user is a valid user.

\* \* \* \* \*